United States Patent
Yang et al.

(10) Patent No.: US 6,203,833 B1
(45) Date of Patent: Mar. 20, 2001

(54) PROCESS FOR PRESERVING FRESH PRODUCE

(75) Inventors: Li Yang; Xiaoming Yang, both of San Diego; Robert J. Petcavich, Del Mar; Lijun Mao, Murrieta, all of CA (US)

(73) Assignee: Planet Polymer Technologies, Inc., San Diego, CA (US)

( * ) Notice: Subject to any disclaimer, the term of this patent is extended or adjusted under 35 U.S.C. 154(b) by 0 days.

(21) Appl. No.: 09/505,236

(22) Filed: Feb. 16, 2000

(51) Int. Cl.$^7$ .............................. A23B 7/153; A23B 7/16
(52) U.S. Cl. .................. 426/310; 426/89; 426/302; 426/321
(58) Field of Search .................. 426/89, 302, 310, 426/321, 331, 333

(56) References Cited

U.S. PATENT DOCUMENTS

| | | | |
|---|---|---|---|
| 1,685,392 | 9/1928 | Beadle | 426/125 |
| 1,817,875 | 8/1931 | Broadbent | 426/419 |
| 2,333,887 | 11/1943 | Redlinger | 426/125 |
| 2,864,708 | 12/1958 | Tebbens | 426/125 |
| 3,037,867 | 6/1962 | Daudin et al. | 426/310 |
| 3,333,967 | 8/1967 | Burg | 426/419 |
| 3,415,661 | 12/1968 | Sincock | 426/125 |
| 3,450,542 | 6/1969 | Badran | 426/419 |
| 3,450,544 | 6/1969 | Dadran | 426/419 |
| 3,950,559 | 4/1976 | Kapoor et al. | 426/419 |
| 4,006,259 | 2/1977 | Kalmar | 426/306 |
| 4,207,347 | 6/1980 | D'Atri et al. . | |
| 4,532,156 | 7/1985 | Everest-Todd . | |
| 4,649,057 | 3/1987 | Thomson . | |
| 4,803,085 | 2/1989 | Findly . | |
| 5,030,510 | 7/1991 | Yokoyama et al. . | |
| 5,093,080 | 3/1992 | Keller . | |
| 5,128,159 | 7/1992 | Sayles . | |
| 5,148,738 | 9/1992 | Orman et al. . | |
| 5,376,391 | 12/1994 | Nisperos-Carriedo . | |
| 5,427,807 | 6/1995 | Chum et al. . | |
| 5,489,442 | 2/1996 | Dunn et al. . | |
| 5,547,693 | 8/1996 | Krochta et al. . | |
| 5,658,607 | 8/1997 | Herdman | 426/419 |
| 5,942,270 | 8/1999 | Oganesoff et al. | 426/268 |

FOREIGN PATENT DOCUMENTS

| | | |
|---|---|---|
| 58-081735 | 5/1983 | (JP) . |
| 60-004102 | 1/1985 | (JP) . |
| 63-042646 | 2/1988 | (JP) . |
| 06038626 | 2/1994 | (JP) . |
| 07059464 | 3/1995 | (JP) . |
| 1793881 | 2/1993 | (RU) . |
| 1353398 | 11/1987 | (SU) . |
| 1375221 | 2/1988 | (SU) . |
| 98/27151 * | 6/1998 | (WO) . |

OTHER PUBLICATIONS

A paper prepared by the applicant entitled "Preservation Coating for Bananas" describing the maturation process and current technologies for the preservation of bananas.
J. of the Korean Agricultural Chem. Soc., 1970, 13(2), pp. 131–151.
Pishchevaya Promyshlennost' USSR, 1989, No. 3, pp. 66–67.
Khimicheskikh Nauk (No. 3), pp. 22–27, 1989.
Izvestiya Akademii Nauk Moldavsloi SSR. Biologicheskie I Khimicheski Nauki (No. 4), 1989, pp. 64–69.

* cited by examiner

*Primary Examiner*—Milton Cano
(74) *Attorney, Agent, or Firm*—Greer, Burns & Crain, Ltd.; Thomas R. Juettner

(57) ABSTRACT

Fresh produce is preserved by coating the exterior surface of the produce with a coating composition comprising an aqueous solution of from about 0.5 to about 4 percent by weight of a cellulose derivative, preferably sodium carboxymethylcellulose, from about 0.05 to about 0.5 percent by weight of konjac, and from about 0.03 to about 0.1 percent by weight of surfactant, preferably dioctyl sodium sulfosuccinate. Optional constituents include antimicrobials, plasticizers and antifoaming agents. The coating composition is effective to control respiratory exchange, i.e., the passage of gases, particularly oxygen, ethylene, carbon dioxide and water vapor, into and out of the produce, thereby to control maturation and ripening of the produce.

8 Claims, No Drawings

PROCESS FOR PRESERVING FRESH PRODUCE

TECHNICAL FIELD

The present invention is directed to a process for preserving fresh produce by coating the same with a coating composition capable of controlling the transmission of gases into and out of the produce during maturation and/or ripening of the produce.

BACKGROUND ART

Current techniques for the preservation of fresh produce consist of temperature and/or pressure treatment or control, wax and similar coating techniques, synthetic polymer coating techniques, and polymer packaging.

Various coating compositions have been proposed, e.g., a petroleum solvent solution of a waxy film former and a fungicide (U.S. Pat. No. 4,006,259), a mixture of lard, tallow and lecithin applied in molten state (U.S. Pat. No. 4,207,347), hydrogenated jojoba oil (U.S. Pat. No. 4,356,197), a salt of carboxylic acid and an alkyl amine (U.S. Pat. No. 4,532,156), a 3% oil-in-water emulsion of hydrogenated vegetable oil, stearic acid and an anionic emulsifier (U.S. Pat. No. 4,649,057), the combination of a food acid, an edible reducing agent and a carbohydrate thickener followed by freezing (U.S. Pat. No. 4,751,091), a denatured proteinaceous solution of soybeans, wheat and corn (U.S. Pat. No. 5,128,159), simultaneously scrubbing and drenching with a liquid containing a fungicide (U.S. Pat. No. 5,148,738), a slurry consisting of by-products of the produce and certain sugars and acids (U.S. Pat. No. 5,364,648), a mixture of a polysaccharide polymer, a preservative, an acidulent and emulsifiers (U.S. Pat. Nos. 5,198,254 and 5,376,391), and a light-activated composition (U.S. Pat. No. 5,489,442).

Various forms of produce packaging are disclosed, by way of example, in U.S. Pat. Nos. 4,769,262; 5,030,510; 5,093,080; 5,160,768; 5,427,807; 5,547,693; and 5,575,418.

Some Russian and Japanese publications have proposed the use of polyvinyl alcohol as a gas barrier coating for produce, but few if any of these suggestions have found their way into the commercial market.

Applications Ser. No. 09/229,374, filed Jan. 13, 1999 now abandoned and allowed Ser. No. 09/461,124, filed Dec. 14, 1999, commonly owned by the assignee of this application, disclose a highly improved process for preserving fresh produce and coating compositions therefor comprised of substantially hydrolyzed cold water insoluble polyvinyl alcohol, low molecular weight cold water soluble starch, and surfactant. Optional additional ingredients are plasticizers, antimicrobials, and antifoaming agents. Preferably the starch is maltodextrin, the surfactant lecithin or dioctyl sodium sulfosuccinate, the antimicrobial methylparaben, and the plasticizer glycerin. However, in order to be effective in preserving fresh produce, the amount of polyvinyl alcohol required in the coating composition is deemed by regulatory authorities to render the coating nonedible for human consumption.

DISCLOSURE OF THE INVENTION

The object of the invention is to provide a new, improved and highly economical process for preserving fresh produce, and a new and improved coating composition therefor.

Another object is to provide a process for preserving fresh produce that prolongs the period during which the produce may be stored at ambient temperatures without critical deterioration of the produce.

A further object is to provide a process for preserving fresh produce that significantly delays maturation and ripening of freshly harvested produce and therefore prolongs the duration of time between harvesting and the state in which the produce is in prime condition for consumption.

In particular, it is a prime object of the invention to provide a coating for preserving fresh produce that regulatory authorities will find is edible and safe for consumption by humans.

In accordance with the invention, the new and improved process resides in the application to the exterior surface of fresh produce of an improved coating composition comprising an aqueous solution of from about 0.5 to about 4 percent by weight of a cellulose derivative, such as carboxymethylcellulose (CMC), hydroxypropyl cellulose (HPC), hydroxypropyl methyl cellulose (HPMC) or methyl cellulose (MC), from about 0.05 to about 0.5 percent by weight of konjac, and from about 0.03 to about 0.1 percent by weight of surfactant, preferably dioctyl sodium sulfosuccinate. Optional additional ingredients include antimicrobials, plasticizers and antifoaming agents.

The coating composition limits but does not prevent respiratory exchange, i.e., transmission of oxygen (air) into the produce, transmission of gases, e.g., ethylene and carbon dioxide, out of the produce, and water vapor transmission, thereby to control, typically to prolong, the maturation and ripening process and, in turn, to increase the permissible storage time between harvest and consumption.

These and other objects and advantages of the invention will become apparent to those of reasonable skill in the art from the following detailed description.

DETAILED DESCRIPTION OF PREFERRED EMBODIMENTS

The following is a detailed description of certain embodiments of the invention which are presently deemed by the inventors to be the best mode of carrying out the invention. Drawings are not deemed necessary inasmuch as the following description will enable any person skilled in the art to make and use the invention.

As above indicated, the invention resides in the discovery that application of a specially formulated coating composition to the exterior surface of fresh fruits and vegetables, especially those having a peel, rind or skin, significantly delays maturation and ripening of the fruits and vegetables. This in turn prolongs the duration of time between harvest and optimum conditions for consumption so that more widespread distribution of fresh fruits and vegetables is accommodated. Additionally, the need for specialized transportation and storage equipment and conditions, such as refrigeration, can in many cases be eliminated or at least alleviated.

Pursuant to the invention, the coating composition is preferably and most easily and economically applied to the exterior surfaces of selected fruits and vegetables by application of a dilute liquid solution.

The solution is preferably aqueous and comprised by weight percent (w/w) of from about 0.5% to about 4%, preferably about 2% of a FDA approved cellulose derivative, such as carboxymethylcellulose (CMC), hydroxypropyl cellulose (HPC), hydroxypropyl methyl cellulose (HPMC) or methyl cellulose (MC), preferably sodium carboxymethylcellulose (CMC), from about 0.05% to about 0.5%, preferably about 0.1% of an edible polysaccharide, preferably the copolymer of glucose and mannose called konjac, and from about 0.03% to about 0.1% preferably about 0.05% of a surfactant, such as dioctyl sodium sulfosuccinate (DSS) or sodium lauryl sulfate.

Optionally, the coating composition may also include any or all of from about 0.05% to about 0.1% antimicrobial, preferably 0.05% methylparaben, a small amount of plasticizer, e.g., glycerin, and from about 0.001% to about 0.01%, preferably about 0.005% of an antifoaming agent, such as polydimethylsiloxane.

The concentration of the constituents in water may range from about 0.6% to about 7% by weight, i.e., the dilute solution is comprised of from about 93% to about 99.4% by weight water.

The aqueous solution may be applied to the produce in any suitable or customary manner, e.g., by dipping the produce in a tank or vat of the solution, by spraying the solution onto the produce, or by passing the produce through a downwardly falling curtain or waterfall of the solution. The entire exterior surface of the produce, or when warranted only portions of the exterior surface of the produce, can be coated with the solution to achieve desired shelf-life extension.

When the produce is coated by spraying, the solids content of the composition preferably should not exceed about 5%, more preferably about 4%.

Following application of the coating, the produce may be packed wet for subsequent shipment, or if desired, the coating may be dried either in quiescent ambient air or a forced air drying tunnel.

The coating formed on the produce has a degree of permeability, thereby enabling the dried coating to "breathe". The extent to which breathing or respiration is accommodated is believed to be a function of the physiological reactions of the species of produce and the relative ratios and the concentration of the constituents of the coating. The coating enables limited transmission of oxygen, i.e., air, into the produce to support the maturation process, but at a significantly slower rate than would be the case without the coating. The "breatheability" of the coating also permits the transmission or passage out of the produce of the ethylene and carbon dioxide gases produced during the maturation process, thereby slowing the process without causing the produce to ferment as is the case with impermeable coatings. In addition, the coating deters water vapor transmission and thereby reduces and/or delays dehydration of produce intended to be consumed moist, e.g., cantaloupes, apples and the like.

To achieve the objects and advantages of the invention and to provide a food coating that regulatory authorities will find to be edible and safe for consumption by humans, the constituents have been carefully selected from approved lists of edible materials that are generally recognized as safe (gras) and the proportions and concentrations have been carefully determined to avoid exceeding any human daily limit on food groups. To insure compliance with regulations, and at the same time to provide a highly efficacious coating for preserving fresh produce, the following coating composition, based on weight percent, is presently preferred:

| CMC | 2% |
|---|---|
| Konjac | 0.1% |
| DSS | 0.05% |
| Methylparaben | 0.05% |

-continued

| Polydimethylsiloxane | 0.005% |
|---|---|
| Water | 97.795% |

The CMC and konjac are the primary constituents for controlling the characteristics of the coating. The surfactant reduces the surface tension of the composition and facilitates the formation of a very uniform and homogeneous coating. Also, it enhances the ability of the composition to uniformly coat and adhere to the produce. The antimicrobial protects the coating material constituents from microbial infestation, thereby to lengthen storage life, and it also protects the ripening produce from mold and parasitic infestation. DSS is a preferred surfactant and methylparaben is a preferred antimicrobial because they are highly effective at low concentrations.

An antifoaming agent is recommended when coating is being manufactured commercially. Blending of the constituents of the coating without an agent frequently results in foaming and a consequent delay in the time of usefulness due to the elapse of time before which the foam dissipates and the blended composition is ready for use. An antifoaming agent eliminates the delay. An antifoaming agent is also useful in dissipating foam caused by turbulence when produce is dipped in a bath and when the coating is sprayed. The use of an antifoaming agent helps to quickly dissipate foaming on the surfaces of the coated produce.

A plasticizer, e.g., glycerin, if used, functions as a lubricant to facilitate uniform distribution and adherence of the coating to the produce, and to render the coating non-brittle at low relative humidity.

By blending the CMC, konjac and surfactant in different proportions, the coating can be tailored to provide different permeabilities to the gas or gases involved, i.e., oxygen, carbon dioxide, ethylene and/or water vapor, thereby to tailor the coating to the respiratory exchange cycles of a variety of fruits and vegetables.

In the case of bananas and other fruits and vegetables having an initial preservation period between harvesting and initiation of the ripening process and a second preservation period between initiation of the ripening process and the time of consumption, the coating process of the invention may be employed for purposes of preservation in either or both of the two periods.

The coating solution is appropriately prepared by heating deionized water and adding the DDS surfactant under agitation or stirring. When the surfactant is completely dissolved, the antimicrobial and antifoaming agent are added and heating is continued. When the temperature of the solution reaches about 50° C. (123° F.), the konjac and CMC powder are slowly added under agitation. Heating is continued until the temperature of the solution reaches 85–90° C. (185–194° F.) and the konjac and CMC are completely dissolved. If water loss occurs during heating, water is added to compensate for the loss and to provide a final solids content within the range of from about 0.6% to about 7%, preferably about 2.2%, and a water content within the range of from about 93% to about 99.4%, preferably about 97.8%. Upon cooling, the coating composition is ready for use.

In an experimental comparative test of the coating composition of the invention, green and firm pears of good quality were purchased from a local supermarket. Three pears were left uncoated and grouped for control; three pears were dip coated with the above-described preferred coating composition containing 2% CMC: and three pears were dip coated with a coating composition containing 1.5% CMC. All nine pears were stored in a refrigerator at 48° F. and 90% relative humidity (RH). Observations for color and firmness were made during the storage period. On day 20, the controls had ripened, were mostly yellow in color (80% yellow and 20% green) and the tissue was soft, while the coated pears were all green and firm. On day 28, the controls were overripe, with completely yellow color and very soft tissue. The pears coated with the 1.5% CMC composition were half ripe with 75% yellow and 25% green color and slight softness, and the pears coated with the 2% CMC composition had just began to "break", with mostly green color and firm tissue. The CMC coatings extended the pear shelf-life for over one week at the storage conditions (48° F. and 90% RH).

In another comparative test, mature green and firm tomatoes were picked from a local farm. Fourteen uncoated tomatoes were grouped for control and fourteen tomatoes were coated with the composition containing 2% CMC. The twenty-eight tomatoes were stored in an air conditioned room at 65° F. and 65% RH. Observations for color and firmness were made during the storage period. On day 21 after coating, 64% of the controls had turned red and soft (ripened), while only 28% of the coated tomatoes had turned red. On day 25, 80% of the controls had turned red, while only 28% of the coated tomatoes had turned red. The 2% CMC coating solution thus significantly delayed tomato ripening at the storage conditions (65° F. and 65% RH).

In a third comparative test of the coating composition of the invention, green limes of good quality were obtained from a fruit distributor. Fifteen of the limes were grouped for control and another fifteen limes were coated with the coating composition containing 2% CMC. The thirty limes were stored in a refrigerator at 47° F. and 85% RH. Observations for color changes (yellowing) were made during a 29 day storage period. The controls showed significant yellowing after 10 days, and the yellowing became more intense as the storage time extended, while no significant color changes were observed for the coated limes throughout the storage period. Thus the 2% coating significantly controlled lime yellowing under the storage conditions.

Additional fruits and vegetables that are likely candidates for successful practice of the invention include apples, avocadoes, bananas, canteloupes, mangoes, papayas, carrots, celery and broccoli.

As shown by the experimental tests, the coating process of the invention significantly enhances control over respiratory exchange, i.e., the gas and water vapor permeability properties of the coated produce, and contributes significantly to prolonged shelf life of fruits and vegetables. Also, the coating inhibits mold growth and exhibits potential for microbe and bacteria control. In addition, the coating may prove useful in controlling bud development in blossoming plants and other like applications.

The objects and advantages of the invention have therefore been shown to be attained in a convenient, economical, practical and facile manner.

While certain preferred embodiments of the invention have been herein described, it is to be appreciated that various changes, rearrangements, modifications and additions may be made thereto without departing from the scope of the invention as defined by the appended claims.

What is claimed is:

1. A process for preserving fresh produce comprising the step of coating the exterior surface of the produce with a coating composition comprising an aqueous solution of from about 0.5 to about 4 percent by weight of a cellulose derivative, from about 0.05 to about 0.5 percent by weight of edible polysaccharide, and from about 0.03 to about 0.1 percent by weight of surfactant.

2. A process as set forth in claim 1, wherein the cellulose derivative comprises carboxymethylcellulose, hydroxylpropyl cellulose, hydroxylpropyl methylcellulose, or methyl cellulose.

3. A process as set forth in claim 1 wherein the edible polysaccharide comprises konjac.

4. A process as set forth in claim 1 wherein the surfactant comprises dioctyl sodium sulfosuccinate or sodium lauryl sulfate.

5. A process as set forth in claim 1 wherein the coating composition includes from about 0.05 to about 0.1 percent by weight antimicrobial.

6. A process as set forth in claim 5 wherein the antimicrobial comprises methylparaben.

7. A process as set forth in claim 1 wherein the coating composition comprises about 2% sodium carboxymethylcellulose, about 0.1% konjac, about 0.05% dioctyl sodium sulfosuccinate, about 0.05% methyl paraben, and about 97.8% water.

8. A process as set forth in claim 6 wherein the coating composition includes about 0.005% polydimethylsiloxane.

* * * * *